May 26, 1953 L. D. COLE 2,640,131
SLIDE DETECTING APPARATUS
Filed Aug. 9, 1951 2 Sheets-Sheet 1
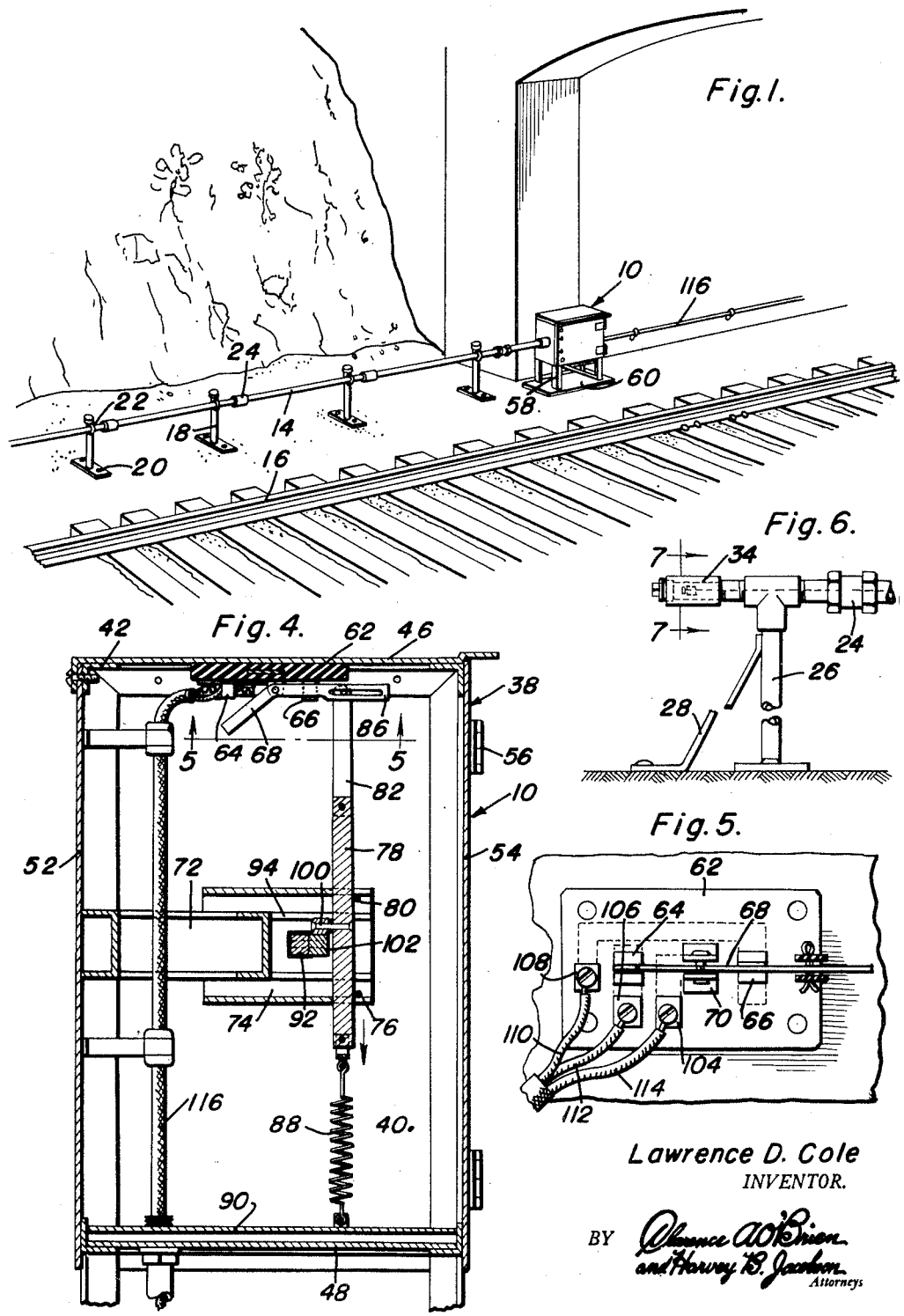
Lawrence D. Cole
INVENTOR.

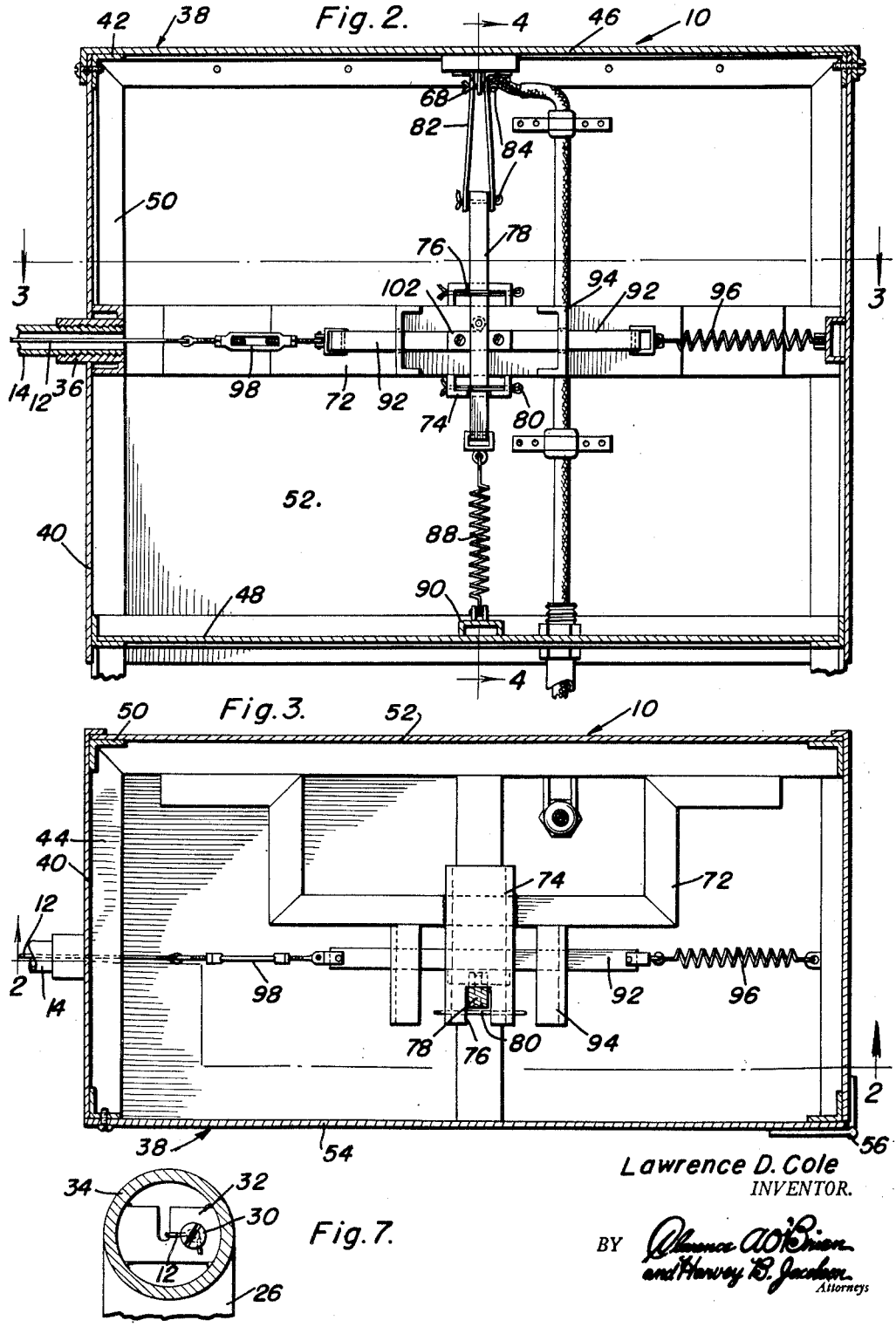

Patented May 26, 1953

2,640,131

UNITED STATES PATENT OFFICE 2,640,131

SLIDE DETECTING APPARATUS

Lawrence D. Cole, Steubenville, Ohio, assignor of one-fourth to James H. McHugh, Steubenville, Ohio Application August 9, 1951, Serial No. 241,031

6 Claims. (Cl. 200—161)

This invention comprises novel and useful improvements in railway signaling apparatus, and more particularly pertains to apparatus for detecting land slides across rail road tracks.

An important object of this invention is to provide a slide detecting and signaling apparatus of the type utilizing an elongated slide detecting cable, which apparatus will not spuriously actuate the warning signal in response to thermal expansion or contraction of the cable, and which apparatus will accurately detect land slides coming in contact therewith.

Another object of this invention is to provide a slide detecting and signaling apparatus, in accordance with the foregoing object, which is responsive to either a tensioning or a severance of the detecting cable, by the land slide, to produce a warning signal indication of the occurrence.

A further object of this invention is to provide a slide detecting apparatus of simple and compact construction and which is reliable in operation.

These, together with various ancillary objects are attained by this device, a preferred embodiment of which is illustrated in the accompanying drawings, wherein:

Figure 1 is a fragmentary perspective view of a rail road right of way with the slide detecting apparatus shown applied thereto;

Figure 2 is a vertical sectional view of the detecting apparatus, taken on the plane of the section line 2—2 of Figure 3;

Figure 3 is a horizontal sectional view, taken on the plane of the section line 3—3 of Figure 2;

Figure 4 is a vertical sectional view of the detecting apparatus, taken on the plane of the section line 4—4 of Figure 2;

Figure 5 is a fragmentary sectional detail view, taken on the plane of the section line 5—5 of Figure 4;

Figure 6 is a side elevational view of one of the detecting wire supports; and

Figure 7 is a sectional view, taken on the plane of the section line 7—7 of Figure 6.

Reference is now made more specifically to the accompanying drawings wherein like numerals designate similar parts throughout the various views, and wherein the slide detecting and signaling apparatus is designated generally by the numeral 10. The slide detecting apparatus employs an elongated cable 12 which is disposed in a suitable sectional housing 14, and which housing and cable are mounted on the right of way, adjacent the tracks 16, at positions whereat slides are liable to occur. For this purpose, there is provided a plurality of standards 18 carried by mounting plates 20, which standards have U-shaped fingers 22 adjacent the upper ends thereof for receiving and supporting the sections 14 of the cable housing. The sections are slidably connected together by couplings 24, to permit thermal expansion and contraction of the cable housing, and also permit the ready replacement of sections which become damaged due to slides, without necessitating disturbing undamaged sections of the housing. One end of the housing is supported on an end standard 26 which is suitably braced as at 28, the cable 12 being secured, as by fastener 30 (Figure 7), to the plate 32, in the anchor sleeve 34 carried by the end standard.

The other end of the cable housing 14 is secured, as by coupling 36 to the control box 38. The control box which may be of any desired construction, may conveniently comprise end walls 40, secured as by angle members 42 and 44 to the top and bottom walls 46 and 48, respectively, and by angle members 50 to the rear wall 52. The front wall 54 is preferably hinged, as at 56, to one of the end walls, to facilitate resetting and repair of the switching apparatus in the control box. The control box, as is best shown in Figure 1, is immovably mounted on legs 58 and base 60, whereby movement of the control cable, which is tensioned between the control box and the end support 26, as will be more fully described hereinafter, actuates the switching mechanism.

The switching mechanism includes a switch block 62 of electrically insulating material, mounted by fasteners 64 to the control box 38, and which block carries a first and second set of contacts 64 and 66, adapted to be engaged by the switch blade 68 which is rockably mounted on brackets 70 disposed between the contacts. As is apparent from Figure 4, the switch blade is movable to engage either of the contacts, but is not adapted to engage both sets of contacts simultaneously.

A U-shaped bracket 72 is secured to the rear wall, and ears 74 having slots 76 therein are secured to opposite sides thereof. A switch actuating member 78 is reciprocably mounted in the slots 76, and retained therein by pins 80, the member being connected, as by links 82 and pins 84 to the slotted end 86 of the switch blade 68. The switch blade is yieldingly biased into engagement with contacts 64 by the spring 88, which is terminally attached to the actuating member 78 and mounting bracket 90 on the bottom wall 48, the actuating member being releasably retained in the position shown in Figures 2 and 4, by the mechanism hereinafter described.

A control rod 92 is slidably mounted in channel brackets 94 carried by bracket 72, and is axially movable in a direction relatively perpendicular to the direction of movement of the actuating member 78. One end of the rod 92 is connected, as by tension spring 96 to the control box 38, the other end of the rod being connected by a turnbuckle 98 to the control cable 12, whereby the latter is yieldably tensioned. The roller 100 on the actuating member 78 engages a block 102 on the rod 92, when the latter is within predetermined limits of the vertical position shown in Figures 2-4 whereby the spring 88 is prevented from moving the actuating member 78 in a direction to cause the switch blade 68 to engage contacts 64, the switch blade being retained in engagement with the contacts 66. The block 102 is of a length such that thermal expansion and contraction of the control cable, which produces a corresponding movement of the control rod, will not release the actuating member. However, displacement or severance of the cable, produced by a bending of the cable housing 14 when the latter is engaged by a slide, will effect the displacement of the control rod sufficient to release the actuating member, and thereby cause the switch blade to engage contacts 64. As will be noted, the actuating member will be released in response to movement of the rod 92 either towards the right or left, as viewed in Figures 2 and 3. Thus, if the control cable becomes slack, as would be caused by a slide which severed the control cable, which engaged a control cable mounted on the outside of the curve, or if the cable is tensioned, as would be caused by bending a straight section of cable housing, the actuating member is released, thereby effecting movement of the switch blade out of engagement with the contacts 66 and into engagement with contacts 64.

The bracket 70 has a binding post 104 connected thereto, the contacts 64 and 66 respectfully having binding posts 106 and 108 connected thereto. The binding post 108 is connected, as by conductor 110 to a suitable signal to indicate that the track is clear of land slides, the post 106 being connected by conductor 112 to a warning signal (not shown) the post 104 being connected by conductor 114 to a source of power which is otherwise connected to the signals. Conductors 110, 112 and 114 are disposed in a suitable sheath 116 which extends to the signaling devices (not shown).

In operation, the cable 12 is mounted in housing 14 along the portion of the railroad right of way where slides are anticipated, the turnbuckle 98 being adjusted so as to center the block 102 on the roller, at the average temperature of the area. The actuating member 78 is then set in the position shown in Figures 2-4, whereby the switch blade engages contacts 66 and energizes a signal (not shown) to indicate that the track is clear of slides. When the control cable and the rod 78 connected thereto are displaced by a slide in the manner hereinbefore set forth, the rod releases the actuating member to effectuate movement of the blade 68 out of engagement with contact 66 and into engagement with contact 64 to thereby energize a suitable warning signal.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention what is claimed as new is:

1. In a land slide detecting apparatus, an elongated slide detecting cable, a support, a switch movably mounted on said support, a switch actuating member attached to said switch, means yieldingly urging said switch actuating member into switch closing position, a rod attached to said cable and mounted for axial movement in a direction transverse the direction of movement of said member, a block in said rod engaging said member to prevent movement of said member into switch closing position, said block having a length sufficient to prevent release of said member in response to thermal expansion and contraction of said cable.

2. In a land slide detecting apparatus, an elongated slide detecting cable, a support, a switch movably mounted on said support, a switch actuating member attached to said switch, means yieldingly urging said switch actuating member into switch closing position, a rod attached to said cable and mounted for axial movement in a direction transverse the direction of movement of said member, a block in said rod engaging said member to prevent movement of said member into switch closing position, said block having a length sufficient to prevent release of said member in response to thermal expansion and contraction of said cable, and means yieldingly urging said rod axially in a direction to tension the cable.

3. In a land slide detecting apparatus, an elongated slide detecting cable, a support, a switch movably mounted on said support, a switch actuating member attached to said switch, means yieldingly urging said switch actuating member into switch closing position, a rod attached to said cable and mounted for axial movement in a direction transverse the direction of movement of said member, a block in said rod engaging said member to prevent movement of said member into switch closing position, said block having a length sufficient to prevent release of said member in response to thermal expansion and contraction of said cable, and means yieldingly urging said rod axially in a direction to tension the cable, said member having a roller thereon engaging said block.

4. The combination of claim 3 wherein said slide detecting cable is mounted within a housing whereby accidental actuation thereof is prevented.

5. The combination of claim 4 wherein said housing is deformable under the pressure of slide material.

6. The combination of claim 3 wherein said roller is movable to a position out of engagement with said block whereby reopening of the switch is prevented.

LAWRENCE D. COLE.

References Cited in the file of this patent

UNITED STATES PATENTS

| Number | Name | Date |
|---|---|---|
| 1,090,816 | Henschel | Mar. 19, 1914 |

FOREIGN PATENTS

| Number | Country | Date |
|---|---|---|
| 79,220 | Austria | Nov. 25, 1919 |